(12) United States Patent
Zimmerman et al.

(10) Patent No.: US 9,917,362 B2
(45) Date of Patent: Mar. 13, 2018

(54) HEMISPHERICAL AZIMUTH AND ELEVATION POSITIONING PLATFORM

(71) Applicant: ViaSat, Inc., Carlsbad, CA (US)

(72) Inventors: Kurt A. Zimmerman, Dunwoody, GA (US); Kevin M. Skinner, Gainesville, GA (US); James W. Maxwell, Alpharetta, GA (US); Cole Dobson, Smyrna, GA (US)

(73) Assignee: ViaSat, Inc., Carlsbad, CA (US)

( * ) Notice: Subject to any disclaimer, the term of this patent is extended or adjusted under 35 U.S.C. 154(b) by 234 days.

(21) Appl. No.: 14/803,310

(22) Filed: Jul. 20, 2015

(65) Prior Publication Data

US 2017/0025752 A1 Jan. 26, 2017

(51) Int. Cl.

| | |
|---|---|
| F04D 15/00 | (2006.01) |
| H02K 7/14 | (2006.01) |
| H01Q 3/08 | (2006.01) |
| F16M 11/18 | (2006.01) |
| H01Q 1/42 | (2006.01) |
| F16M 11/10 | (2006.01) |
| F16M 11/20 | (2006.01) |

(52) U.S. Cl.
CPC ............. *H01Q 3/08* (2013.01); *F16M 11/10* (2013.01); *F16M 11/18* (2013.01); *F16M 11/2014* (2013.01); *H01Q 1/42* (2013.01)

(58) Field of Classification Search
CPC . H01C 3/08; H01C 3/02; H01C 1/125; H01C 19/13; H01C 1/18; H01C 1/34; H01C 1/3275; H01C 1/42; H01C 21/28; H01C 25/00; H01C 19/062; H01C 3/04; H01C 3/10; H01C 3/14; H01C 3/2664; Y02E 10/47

USPC .............. 318/3, 625; 342/195; 343/757, 758
See application file for complete search history.

(56) References Cited

U.S. PATENT DOCUMENTS 3,707,721 A * 12/1972 McCartney .............. H01Q 3/10
                                                                                                                                                                    318/625
3,848,255 A     11/1974 Migdal
4,020,491 A *  4/1977 Bieser ..................... F16F 15/02
                                                                                                                                                                    33/318

(Continued)

FOREIGN PATENT DOCUMENTS

| EP | 1246296 A1 | * | 12/2001 |
| GB | 896374 | * | 5/1962 |
| GB | 2266996 A | * | 11/1993 |

*Primary Examiner* — Paul Ip
(74) *Attorney, Agent, or Firm* — Holland & Hart LLP

(57) ABSTRACT

An antenna positioner, and methods of positioning using the antenna positioner, that may track a satellite are described. An antenna positioner may include a base and a mount rotatably coupled to the base to turn the mount about an azimuth axis. The mount may support an antenna element so that the antenna element can rotate about the elevation axis with respect to the mount. A center drive shaft for the elevation drive may pass through the hollow portion of the mount along the azimuth axis to drive a bevel gear set, a first gear of the set being coupled to the drive shaft and a second gear of the set being coupled to the antenna element, to rotate the antenna element about the elevation axis. Drive compensation is provided to counteract elevation rotation resulting from cross-coupling of the azimuth and elevation axes by the bevel gear set during azimuth rotation.

20 Claims, 9 Drawing Sheets

(56) References Cited

U.S. PATENT DOCUMENTS

| | | | | |
|---|---|---|---|---|
| 4,158,833 A * | 6/1979 | Chicoine | | B60Q 1/44 200/61.28 |
| 4,162,384 A * | 7/1979 | Chicoine | | B60Q 1/44 200/61.88 |
| 4,209,789 A * | 6/1980 | Snedkerud | | H01Q 1/34 343/765 |
| 4,368,962 A * | 1/1983 | Hultberg | | F24J 2/38 126/605 |
| 4,905,543 A * | 3/1990 | Choi | | F16M 11/08 248/349.1 |
| 5,517,204 A * | 5/1996 | Murakoshi | | H01Q 1/18 248/183.1 |
| 6,023,247 A * | 2/2000 | Rodeffer | | H01Q 1/18 343/765 |
| 6,128,135 A * | 10/2000 | Stiles | | F21S 11/00 359/597 |
| 6,188,300 B1 * | 2/2001 | Rodeffer | | H01Q 1/18 333/261 |
| 6,285,339 B1 | 9/2001 | McGill | | |
| 6,396,448 B1 | 5/2002 | Zimmerman et al. | | |
| 6,480,161 B2 * | 11/2002 | Watson | | H01Q 3/02 343/758 |
| 6,486,845 B2 * | 11/2002 | Ogawa | | H01Q 1/42 343/757 |
| 6,559,805 B2 * | 5/2003 | Yamauchi | | H01Q 3/08 343/765 |
| 6,559,806 B1 * | 5/2003 | Watson | | H01Q 3/02 343/758 |
| 6,850,202 B2 * | 2/2005 | Watson | | H01Q 3/02 343/766 |
| 6,950,061 B2 | 9/2005 | Howell et al. | | |
| 7,141,772 B2 * | 11/2006 | Jung | | G01C 3/32 250/203.4 |
| 7,798,050 B2 * | 9/2010 | Sembtner | | F41A 27/06 89/41.02 |
| 8,059,048 B2 * | 11/2011 | Felstead | | H01Q 3/08 343/766 |
| 8,381,718 B1 * | 2/2013 | Luconi | | F24J 2/542 126/606 |
| 8,459,249 B2 * | 6/2013 | Corio | | H02S 20/32 126/600 |
| 8,587,775 B1 * | 11/2013 | Wilson | | F24J 2/542 356/139.01 |
| 8,922,047 B2 * | 12/2014 | Yoon | | F03D 11/02 290/44 |
| 2002/0011958 A1 * | 1/2002 | Ogawa | | H01Q 1/42 343/761 |
| 2002/0084948 A1 * | 7/2002 | Watson | | H01Q 3/02 343/882 |
| 2002/0140620 A1 * | 10/2002 | Yamauchi | | H01Q 3/08 343/882 |
| 2003/0112194 A1 * | 6/2003 | Watson | | H01Q 1/125 343/757 |
| 2005/0105076 A1 * | 5/2005 | Jung | | G01C 3/32 356/4.01 |
| 2008/0264246 A1 * | 10/2008 | Sembtner | | F41A 27/06 89/41.02 |
| 2008/0308091 A1 * | 12/2008 | Corio | | H02S 20/32 126/606 |
| 2009/0231224 A1 * | 9/2009 | Felstead | | H01Q 19/13 343/766 |
| 2010/0001900 A1 * | 1/2010 | Imai | | G01S 7/03 342/195 |
| 2012/0286519 A1 * | 11/2012 | Yoon | | F03D 11/02 290/55 |
| 2013/0021214 A1 | 1/2013 | Zimmerman et al. | | |
| 2014/0263803 A1 * | 9/2014 | Dominicis | | B65H 55/046 242/478.2 |
| 2014/0338659 A1 * | 11/2014 | Corio | | F24J 2/541 126/714 |
| 2015/0097743 A1 | 4/2015 | Evans | | |

* cited by examiner

HEMISPHERICAL AZIMUTH AND ELEVATION POSITIONING PLATFORM

BACKGROUND

High data rate communications from a ground-based antenna to a satellite in geosynchronous or geostationary earth orbit (GEO), medium earth orbit (MEO), or low earth orbit (LEO) may use a positioner on the antenna to allow movement that compensates for movements of the antenna and/or the satellite, so that the antenna remains pointed at the satellite. Antennas may include horns, reflectors, flat panel arrays, or various other radio frequency (RF) apertures to transmit and/or receive communications with the satellite. Such antenna positioners for an antenna may allow for movement, i.e. positioning of the antenna, about both an elevation axis and an azimuth axis. Where the antenna positioner is mounted to a mobile platform, such as an aircraft, vessel, or vehicle, the antenna positioner may need a range of 360° of rotation about the azimuth axis and a range of approximately 90° of rotation about the elevation axis to allow the antenna positioner to continue to point the antenna at the satellite during movement of the mobile platform. To allow unrestricted movement of the mobile platform, the antenna positioner may need to allow for continuous (free) rotation of the antenna about the azimuth axis.

The described antenna positioners need a way to drive the rotation about the azimuth axis and a way to drive the rotation about the elevation axis. Several mechanisms have been proposed for elevation over azimuth (EL/AZ) type designs, where an antenna element may rotate about the elevation axis of a mount of the antenna positioner, and the mount and antenna element together may rotate about the azimuth axis.

One system to drive an antenna positioner is to connect a first drive motor to an azimuth drive shaft to drive rotation of the antenna positioner about the azimuth axis. Then, to drive the antenna positioner about the elevation axis, a second drive motor is connected to the elevation axis to drive rotation of the antenna positioner about the elevation axis. Such drive motors typically require several different electrical connections for power, control, etc. For the azimuth motor, which may be fixedly mounted to the mobile platform along with the stationary portions of the antenna positioner, such electrical connections may simply be metal wires. However, the drive motor for the elevation axis rotates about the azimuth axis along with the rotatable portions of the antenna positioner. If metal wires are used for this drive motor, as the drive motor rotates about the azimuth axis, the wires may bind, restricting azimuth rotation of the antenna positioner and preventing free rotation of the antenna positioner about the azimuth axis during movement of the mobile platform.

One mechanism to provide an electrical connection to an elevation motor is to use a rotary mechanism, such as a rotary joint employing a slip ring, e.g. a brush block slip ring, to pass RF, power, and control signals across the azimuth rotating interface for the elevation motor. However, such rotary mechanisms have several disadvantages, including relatively large size and cost, as well as somewhat poor reliability, e.g. one or both of the brushes of the slip ring and the rotary joint may wear out. In addition, rotary joints may have large insertion losses.

SUMMARY

Methods, systems, and devices are described for positioning an antenna. An antenna positioner may include a base and a mount rotatably coupled to the base to turn the mount about an azimuth axis. The mount may support an antenna element so that the antenna element can rotate about the elevation axis with respect to the mount. A center drive shaft for the elevation drive may pass through the hollow portion of the mount along the azimuth axis to drive a bevel gear set, a first gear of the set being coupled to the drive shaft and a second gear of the set being coupled to the antenna element, to rotate the antenna element about the elevation axis.

Drive compensation may be to counteract elevation rotation resulting from cross-coupling of the azimuth and elevation axes by the bevel gear set during azimuth rotation. Such cross-coupling may be caused by the configuration of the bevel gear set, which includes a first bevel gear mounted to the center drive shaft and a second bevel gear mounted to the antenna element. Such compensation may be provided by driving the elevation drive shaft to counteract the rotation that would otherwise be caused by driving the mount about the azimuth axis.

An apparatus for positioning an antenna is described. The apparatus may include a base; a mount rotatably coupled with the base about an azimuth axis of the mount; an antenna element supported by and rotatably coupled with the mount about an elevation axis of the mount; a center drive shaft extending through the mount along the azimuth axis; and a bevel gear set comprising a first bevel gear and a second bevel gear, the first bevel gear fixedly coupled with the center drive shaft and the second bevel gear fixedly coupled with the antenna element, such that the bevel gear set rotates the antenna element about the elevation axis in response to a rotation of the center drive shaft.

In some examples of the apparatuses described herein, the first bevel gear includes a pinion gear coupled with the center drive shaft to rotate about a pinion gear axis, and the second bevel gear includes a partial ring gear to be driven by the pinion gear to rotate about a ring gear axis. In some examples, the pinion gear includes a plurality of pinion gear teeth, and the partial ring gear comprises a plurality of ring gear teeth to alternately mesh with the plurality of pinion gear teeth. In some examples, the ring gear axis is coaxial with the elevation axis.

In some examples of the apparatuses described herein, the bevel gear set includes a friction drive gear set. In some examples, the center drive shaft and the first bevel gear are hollow. In another example, the center drive shaft and the first bevel gear together comprise a single workpiece.

In some examples of the apparatus described herein, the apparatus further comprises an elevation drive gear set, including a first elevation gear coupled with an elevation motor about a first elevation gear axis; and including a second elevation gear coupled with and driven by the first elevation gear, the second elevation gear fixedly coupled with the center drive shaft. In some examples, the second azimuth gear is coupled with the first azimuth gear via an azimuth drive belt.

In some examples, the antenna element includes a passive reflecting device supported by the mount, and an antenna feed pointed at the passive reflecting device. In some examples, the apparatus may further include an antenna feed having a location that is fixed relative to the base.

In some examples of the apparatus described herein, the apparatus further includes a control circuit; an azimuth motor coupled with the control circuit and the mount; and an elevation motor coupled with the control circuit and the center drive shaft to drive the center drive shaft, wherein the control circuit controls the azimuth motor to drive the mount about the azimuth axis to track azimuth movement of a signal target relative to the antenna, and controls the elevation motor to drive the center drive shaft to counteract a rotational cross-coupling between the azimuth axis and the elevation axis due to the bevel gear set. In some examples, the control circuit controls the elevation motor to maintain a fixed elevation point of the antenna element during a rotation of the antenna element about the azimuth axis.

A method of positioning an antenna is described. The method may include driving a mount supporting an antenna element to cause a rotation of the antenna element about an azimuth axis to track azimuth movement of a signal target, wherein the rotation of the antenna element about the azimuth axis is cross-coupled with an elevation axis through a bevel gear set, wherein the bevel gear set comprises a first bevel gear mounted to a center drive shaft extending through the mount along the azimuth axis and a second bevel gear mounted to the antenna element; and driving the center drive shaft while driving the mount to counteract a change in an elevation caused at least in part by the cross-coupling.

In some examples of the method, driving the center drive shaft while driving the mount to counteract the change in the elevation caused at least in part by the cross-coupling includes maintaining the elevation at a fixed elevation point of the antenna element during the rotation of the antenna element about the azimuth axis.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
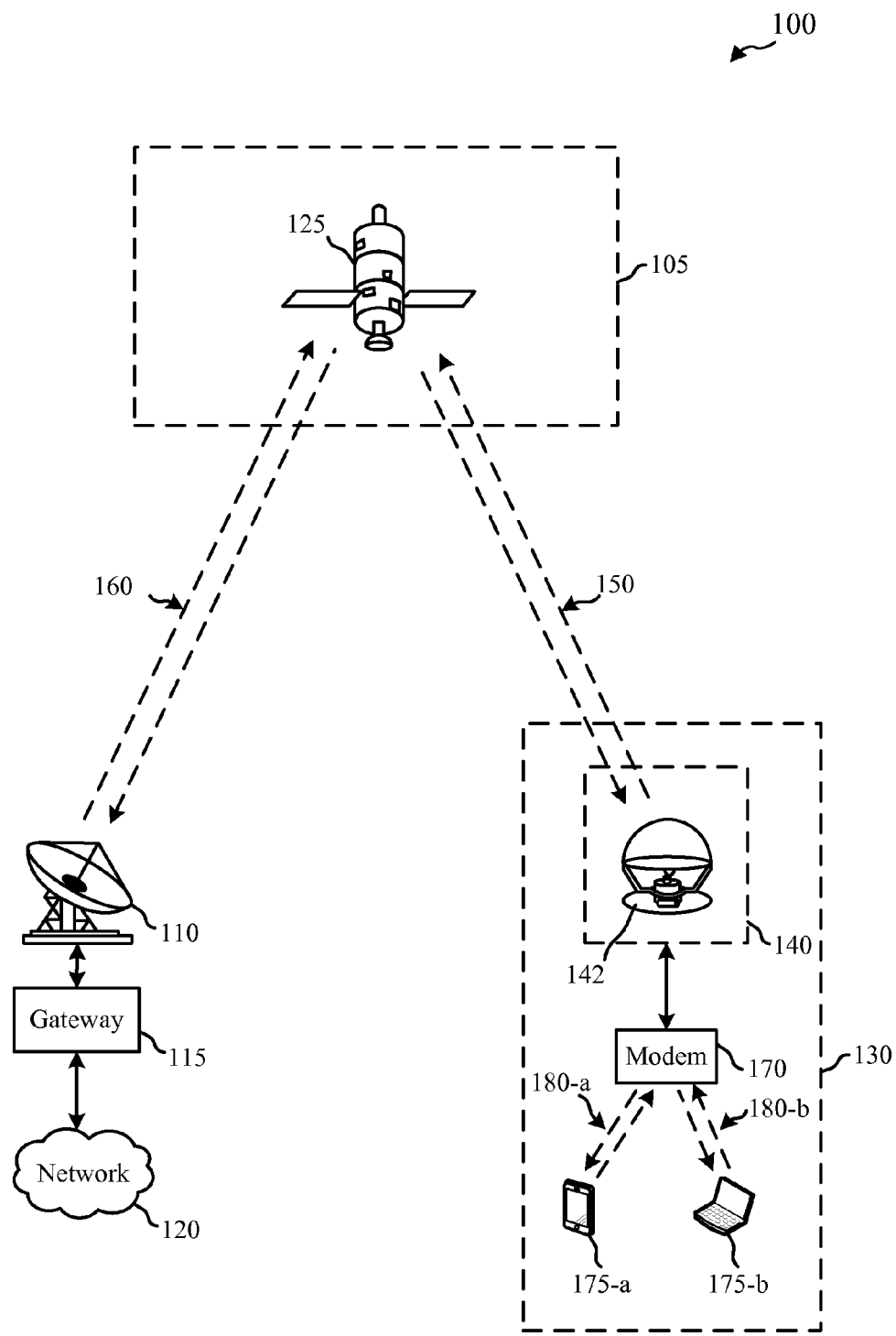
FIG. 1 shows a diagram of a satellite communication system in accordance with various embodiments.

The described features generally relate to a methods, systems, and devices for positioning one or more antenna elements of an antenna assembly.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

The antenna positioners described herein may include a base, and a mount that may be rotatably coupled to the base to rotate about an azimuth axis. The antenna positioner may also include an antenna element supported by the mount to rotate the antenna element about the azimuth axis to change the azimuth angle of a beam sent or received by the antenna element. The antenna element may vary from embodiment to embodiment. In some embodiments, the antenna element includes a passive reflecting device supported by and rotatably coupled with the mount, and an antenna feed that is mounted in a stationary position with respect to the base. In such a case, the passive reflecting device may rotate both about an azimuth axis and an elevation axis relative to the base and the feed. As used herein, a "passive reflecting device" is a portion of the antenna element that does not include any direct connection for receiving signals such as RF, power, control signals, etc. By arranging the passive reflecting device in such a manner, cables or other assemblies such as a slip ring can be avoided. The passive reflecting device can vary from embodiment to embodiment. For example, the passive reflecting device may include a lens, a reflector, or other collimating or non-collimating passive device. As another example, the passive reflecting device may be a flat polished metal plate or a high dielectric constant surface which redirects incoming energy. As yet another example, the passive reflecting device may include a combination of dielectric and reflector surfaces or etched arrays of elements that are resonant and reflecting to one frequency range and transparent to another frequency range. As yet another example, the passive reflecting device may include a spherical mirror. The antenna feed can also vary from embodiment to embodiment. In some embodiments the antenna feed may be, for example, a horn, a spiral element, a helix element, a patch element, a slot, a dielectric rod, a dipole element, monopole element, or other type of feed element. In some embodiments, the antenna feed includes multiple feed elements.

The mount may have a gear or pulley fixedly attached to the mount, which gear or pulley may be driven to rotate the mount about the azimuth axis via a series of one or more additional gears or pulleys mechanically coupled to a motor mounted to the base. Extending through the mount along the azimuth axis may be a center drive shaft for rotating the antenna element about the elevation axis. Attached to both the center drive shaft and the rotatable antenna element may be a bevel gear set, operating to transfer the rotation of the center drive shaft about its central axis to a rotation of the antenna element about the elevation axis. The central axis of the center drive shaft may be substantially aligned and coaxial with the azimuth axis of the mount. The bevel gear of the bevel gear set attached to the antenna element may be a partial gear such as a partial ring gear. The bevel gear set may be straight bevel gears, spiral bevel gears, a friction gear set, or another arrangement of bevel gears to transfer rotation of a center drive shaft to the antenna element. Like the mount, the center drive shaft may have a gear or pulley fixedly attached to the center drive shaft opposite the bevel gear set, which may be driven to rotate the center drive shaft about its central axis via a series of one or more additional gears or pulleys mechanically coupled to a motor mounted to the base.

The above-described antenna positioners may increase stiffness of an antenna positioner, for example by reducing twisting, bending, and stretching of components, which may increase positioning precision. They may also reduce backlash during movement, resulting in decreased jiggle and deadband. Furthermore, because a rotary mechanism, such as a rotary joint employing a slip ring, need not be used for the above-described antenna positioners, reliability and robustness may be improved, while cost may also be lowered.

FIG. 1 shows a diagram of a satellite communication system 100 in accordance with various embodiments. The satellite communication system 100 includes a satellite system 105, a gateway 115, a gateway antenna system 110, and a mobile platform 130. The mobile platform may be any of various aircraft, vessels, and/or vehicles, e.g. a helicopter, ship, bus, or truck, that may want to maintain communications with a satellite 125 of a satellite system 105 during movement of the mobile platform 130. Mobile platform 130 may need to maintain communications with a satellite 125 by controlling positioning of an antenna towards the satellite 125 during movement of the mobile platform 130. The mobile platform 130 may also be used while stationary, or be mounted to a fixed system, e.g. a ground-based stationary system. The gateway 115 communicates with one or more networks 120. In operation, the satellite communication system 100 provides for two-way communications between the mobile platform 130 and the one or more networks 120 through the satellite system 105 and the gateway 115.

The satellite system 105 may include one or more satellites. The one or more satellites in the satellite system 105 may include any suitable type of communication satellite. In some examples, some or all of the satellites may be in geosynchronous orbits. In other examples, any appropriate orbit (e.g., low earth orbit (LEO), etc.) for satellite system 105 may be used. Some or all of the satellites of satellite system 105 may be multi-beam satellites configured to provide service for multiple service beam coverage areas in a predefined geographical service area.

The gateway antenna system 110 may be two-way capable and designed with adequate transmit power and receive sensitivity to communicate reliably with the satellite system 105. The satellite system 105 may communicate with the gateway antenna system 110 by sending and receiving signals through one or more beams 160. The gateway 115 sends and receives signals to and from the satellite system 105 using the gateway antenna system 110. The gateway 115 may be connected to the one or more networks 120. The networks 120 may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and the like.

The mobile platform 130 has an on-board communication system, including an antenna system 140, which includes an antenna positioner 142. The mobile platform 130 may use the antenna system 140 to communicate with the satellite system 105 over one or more beams 150. The antenna positioner 142 may position an antenna element with respect to elevation and azimuth orientations so that an antenna element may transmit and or receive the beams 150, i.e. receive wireless communications signals from and/or transmit wireless communications signals to a satellite of satellite system 105, including during movement of the mobile platform 130. That is, the antenna positioner 142 may actively track the satellite 125 during movement. The antenna positioner 142 may include a radome and be mounted on the outside of the mobile platform 130. Antenna system 140 may include additional elements to support communications with satellite system 105 mounted either under the radome or elsewhere within the mobile platform 130.

In other examples, other types of housings are used with the antenna system 140. The depth of the antenna system 140 may directly impact the size of the radome, for which a low profile may be desired.

The on-board communication system of the mobile platform 130 may provide communication services for communication devices of the mobile platform 130 via a modem 170. Communication devices 175 may connect to and access the networks 120 through modem 170. Communication devices 175 may communicate with one or more networks 120 via network connections 180, which may be wired or wireless. A wireless connection may be, for example, of a wireless local area network (WLAN) technology such as IEEE 802.11 (Wi-Fi), or other wireless communication technology.

Figure 2:
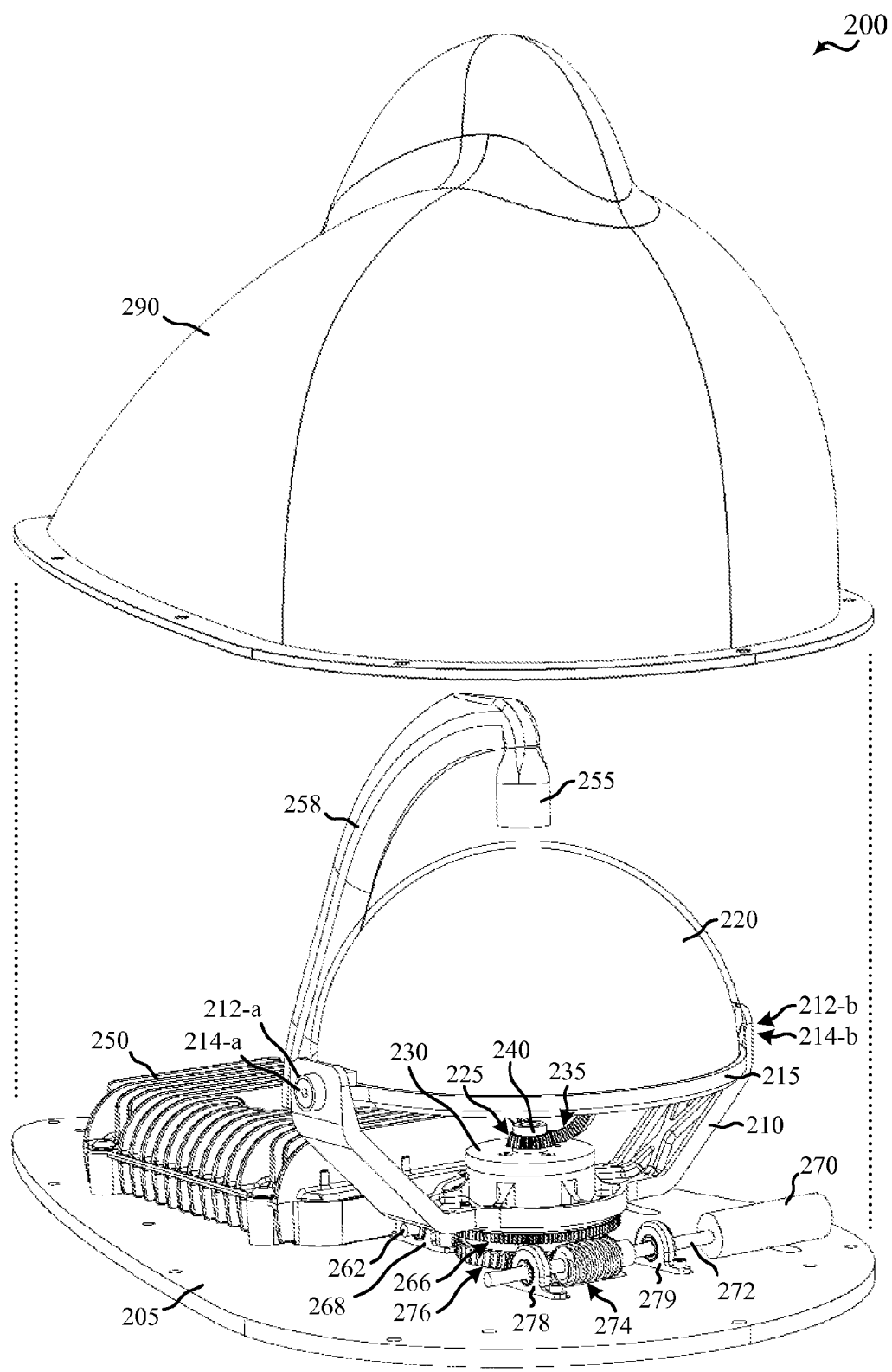
FIG. 2 illustrates a front-left-top perspective view of an antenna assembly, including an antenna positioner, in accordance with various aspects of the present disclosure.

FIG. 2 illustrates a front-left-top perspective view of an antenna assembly 200, including an antenna positioner, in accordance with various aspects of the present disclosure. Various elements of the antenna assembly 200 may be directly or indirectly mounted to base 205. The antenna assembly 200 includes a radome 290, which is shown removed from base 205 to reveal the elements within.

Mount 210 (which may also be referred to as a yoke), may be rotatably coupled to base 205 through two sets of internal bearings and the center drive shaft 230 (which may also be referred to as an elevation drive shaft). Mount 210 is rotatably coupled to base 205 such that mount 210 rotates about an azimuth axis in this configuration. An azimuth ring gear 266 may be mounted and fixed to mount 210. Azimuth ring gear 266 may be a spur ring gear, the teeth of which alternately mesh with the teeth of a spur gear (not shown). As further illustrated with reference to spur gear 280 and worm gear 285 in FIG. 4 below, the spur gear (not shown)

may be coaxially mounted to and mechanically coupled with the worm gear (not shown). The teeth of the worm gear (not shown) may mesh with a worm screw (not shown) that may be mounted on rod 262. Rod 262 may be rotatably supported by at least two bearing assemblies, including bearing assembly 268 and a second bearing assembly (not shown), and may be driven by an azimuth motor (not shown) mounted on the base 205. Thus, the azimuth motor (not shown) may be mechanically coupled to mount 210 to drive a rotation of mount 210 about an azimuth axis.

In other configurations, other suitable gear types may be substituted for one or more of the azimuth ring gear 266, the spur gear (not shown), the worm gear (not shown), and the worm screw (not shown). In one configuration, azimuth ring gear 266 may be a worm gear, the central axis of rotation of which may be coaxial with the azimuth axis, and the teeth of which mesh with a worm screw driven by the azimuth motor (not shown) whose axis of rotation may be perpendicular with the azimuth axis. In a second configuration, the teeth of azimuth ring gear 266 may alternately mesh with the teeth of a spur gear directly driven by a pancake-style motor, such that the axis of rotation of the motor is parallel with the azimuth axis. In a third configuration, azimuth ring gear 266 may be beveled, spiral, herringbone, spur, or any other suitable configuration to drive a rotation of the mount 210 about the azimuth axis, where a gear to drive the azimuth ring gear 266 may be a complementary driving gear. In yet other configurations, a number of gears or combinations of gears may be used to drive the azimuth ring gear 266.

The azimuth motor (not shown) may any suitable drive motor that may be controlled by a control circuit of transceiver 250, e.g. a stepper motor. The azimuth motor may have a different form factor, for example, pancake-style, etc. Azimuth motor may be a permanent magnet or hybrid stepper motor, and may be a two-phase bipolar or four-phase unipolar stepper motor, etc. The positioning resolution of the antenna positioner may be based at least in part on the positioning resolution of the stepper motor, which may be any suitable resolution to provide the desired positioning precision for the antenna positioner, for example, twenty-four, forty-eight, or two hundred steps per revolution, etc.

Figure 5:
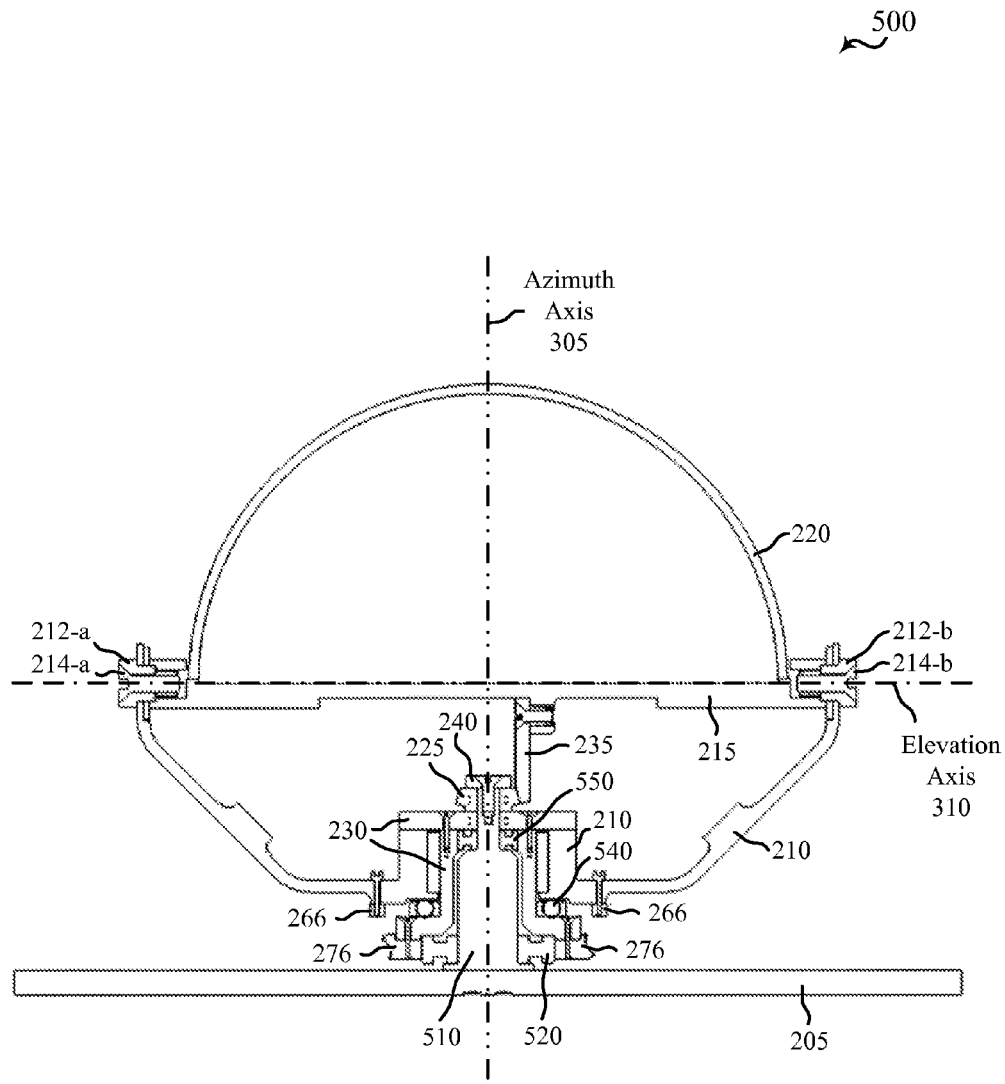
FIG. 5 illustrates a cross-sectional view of portions of an antenna positioner of an antenna assembly, in accordance with various aspects of the present disclosure.

Returning to mount 210 and referring now to FIG. 5, mount 210 contains a hollow opening along the azimuth axis 305 through which center drive shaft 230 may be disposed and spaced apart from mount 210. Center drive shaft 230 may be disposed and spaced apart from mount 210 by bearings 520 and bearings 550. Center drive shaft 230 may be made up of two portions, including a cap and a hollow shaft that are fixedly mounted by means of bolts. The center drive shaft 230 itself may be supported by a support element 510 disposed through the hollow shaft of center drive shaft 230, and separated from and supporting the hollow shaft of center drive shaft 230 by bearings 520 and bearings 550 to allow the hollow shaft of center drive shaft 230 to rotate about the support element 510. The support element 510 may be fixedly mounted to base 205, and have a fixing cap 240 to secure various rotatable portions of the antenna positioner to the base 205.

In other configurations, the support element 510 may also be hollow. The hollow support element may allow the passage of various signals, conductors, supports, or other objects or signals from below mount 210 to pass through the azimuthally rotatable interface at mount 210 to above mount 210.

Returning to FIG. 2, mounted to the cap of center drive shaft 230 is a bevel gear set, including bevel gear 225 that may have a number of gear teeth. Bevel gear 225 may be symmetric about a first bevel gear axis. Bevel gear 225 may be a pinion gear that is symmetric about the first bevel gear axis. In the example where bevel gear 225 is a pinion gear, the first bevel gear axis is a pinion gear axis. Bevel gear 225 may also be mounted to the center drive shaft 230 so that the first bevel gear axis is coaxial with the central axis of the center drive shaft. The first bevel gear axis and central axis of the center drive shaft may each be aligned with the azimuth axis. The gear teeth of bevel gear 225 may be straight gear teeth that are angled approximately 20° from the first bevel gear axis.

The straight gear teeth of bevel gear 225 alternately mesh with the straight gear teeth of a bevel gear 235. Bevel gear 235 may be coupled to the reflector 215 of the lens/reflector assembly. Bevel gear 235 may be, for example, a partial ring gear. The bevel gear 235 has a radius from a second bevel gear axis, and follows a circular arc whose center point falls substantially on the elevation axis. In the example where bevel gear 235 is a partial ring gear, the second bevel gear axis is a partial ring gear axis. The second bevel gear axis, which is the line that both passes through the center point of the circular arc and may be perpendicular to the circular arc defined by the bevel gear 235, may be substantially coaxial with the elevation axis. The gear teeth of bevel gear 235 may be straight gear teeth that are angled at approximately 70° from the elevation axis (and may be angled approximately the same as the gear teeth of bevel gear 225 with respect to both the azimuth axis and the elevation axis where the gear teeth of bevel gear 235 alternately mesh with the gear teeth of bevel gear 225). Thus, bevel gear 225 rotates about the first bevel gear axis to cause bevel gear 235, and thus reflector 215 and lens 220, and/or other elements supported by mount 210, to rotate about the elevation axis.

Thus, by driving rotation of center drive shaft 230 about its central axis, the bevel gear 235 mounted to reflector 215 may rotate reflector 215 and lens 220 about the elevation axis, effectively transferring the rotation of center drive shaft 230 about its central axis into an elevation rotation.

In accordance with other variations, the gear teeth of bevel gear 225 may be angled at a different angle with respect to the central axis of center drive shaft 230. In some configurations the gear teeth may be angled at 45° with respect to the central axis. In some configurations the gear teeth may be angled between 5° and 45° with respect to the central axis. In still other variations, the gear teeth of bevel gear 225 may be angled between 45° and 85° with respect to the central axis.

In accordance with still other variations, rather than the bevel gear set having straight gear teeth, bevel gear 225 may have spiral gear teeth that alternately mesh with spiral gear teeth of bevel gear 235. In still other variations, the bevel gear set, rather than having gears with teeth, may have two friction wheels to transfer a drive force from the center drive shaft 230 to the lens/reflector assembly. The face angles of the bevel gears for these other variations may likewise vary. In some variations, the angle may be 20° with respect to the central axis of center drive shaft 230. In other variations the angle may be 45° with respect to the central axis. The angle may also fall in the range from 5° to 45° degrees or in the range from 45° to 85° degrees.

In accordance with yet other variations, the teeth of bevel gear 235 may taper near where bevel gear 235 mounts to reflector 215 of the antenna element in order to provide a soft stop for rotation of the antenna element about the elevation axis. In such case, where the teeth of bevel gear 225 pass through the tapered portion of the bevel gear 235, the teeth of bevel gear 225 may disengage from the tapering teeth of bevel gear 235, allowing bevel gear 225 to freely rotate and allow the soft stop of the rotation of the antenna element. Such a soft stop mechanism may prevent damage to the antenna positioner that may be caused by a hard stop.

In other variations the bevel gear 235 may be fastened to spacers or other elements that are then fastened to reflector 215, rather than directly coupled to reflector 215.

At the end of the center drive shaft 230, opposite the bevel gear set, may be elevation ring gear 276. Elevation ring gear 276 may be fixedly attached to the center drive shaft 230. In some examples, elevation ring gear 276 may be a worm gear, the teeth of which mesh with an elevation worm screw 274. Elevation worm screw 274 may rotate on a rod 272 that may be rotatably supported by bearing assembly 278 and bearing assembly 279 to drive elevation ring gear 276. Rod 272 may be driven to rotate clockwise or counter-clockwise by elevation motor 270. As with the azimuth motor (not shown), elevation motor 270 may be any suitable drive motor that may be controlled by a control circuit of transceiver 250, e.g. a stepper motor. Such stepper motor may be any suitable form factor, including as a standard or pancake-style formfactor, etc., may be a permanent magnet or hybrid stepper motor, and may be a two-phase bipolar or four-phase unipolar stepper motor, etc. The positioning resolution of the stepper motor may be, for example, twenty-four, forty-eight, or two hundred steps per revolution, or another suitable resolution, etc.

In other configurations, other suitable gear types may be substituted for one or more of the elevation ring gear 276 and/or elevation worm screw 274. In one configuration, elevation ring gear 276 may be spur ring gear, the central axis of rotation of which is coaxial with the azimuth axis, and the teeth of which mesh with a spur gear directly driven by a pancake-style motor, such that the axis of rotation of the pancake-style motor may be parallel with the azimuth axis. In other configurations, azimuth ring gear 266 may be beveled, spiral, herringbone, spur, or any other suitable configuration to drive a rotation of the center drive shaft 230 about its central axis. In yet other configurations, a greater number of gears or combinations of gears may be used to drive the elevation ring gear 276.

Returning to mount 210, mount 210 may rotatably support an antenna element through a pair of bushings, bushing 212-a and bushing 212-b, which are slidably secured between mount 210 and reflector 215 with a pair of bolts inserted into reflector 215, bolt 214-a and bolt 214-b, respectively. Bolt 214-a and bolt 214-b may also be inserted into one or more supports, to which reflector 215 may be attached.

A lens 220, e.g. a dome-shaped RF lens, may also be secured to reflector 215. Lens 220 and reflector 215, together a lens/reflector assembly, are together designed to focus an incident RF plane wave to an antenna feed 255 and transmission line 258 that are each fixed with respect to the base 205 as the lens/reflector assembly rotates with respect to base 205. Antenna feed 255 may be positioned about lens 220 and reflector 215, and/or direct an RF output from antenna feed 255 as a transmitted plane wave. The lens/reflector assembly may be a passive element that directs and focuses RF signals to and from the antenna feed 255. Lens 220 of the lens/reflector assembly may enhance and organize the RF energy being directed to antenna feed 255 or from antenna feed 255. Reflector 215 redirects the RF energy to antenna feed 255. Antenna feed 255 radiates inwardly toward the lens/reflector assembly. The lens/reflector assembly then collimates the beam emitted by the antenna feed 255, directs the beam outwardly, and points the beam in the desired direction. Antenna feed 255 may be a horn. In other embodiments, antenna feed 255 may be a patch element, a spiral element, a helix element, a dipole element, etc. Transmission line 258 may be, for example, a waveguide, a coaxial cable, etc. The antenna feed 255 may be positioned in a center-uppermost, or zenith, position. In other configurations, antenna feed 255 may be oriented away from the zenith position, for example a certain number of degrees away from the zenith position. For example, in one configuration antenna feed 255 may radiate toward the lens/reflector assembly at a position that is 20° from the zenith position.

Antenna feed 255 may be fixedly mounted and communicatively coupled to a transceiver 250 via transmission line 258. Transceiver 250 can receive, generate, process, and transmit various signals, including incoming and outgoing RF signals. Transceiver 250 may also contain certain control circuits for the antenna positioner, e.g. motor control circuits.

The antenna assembly 200 further includes a radome 290 (shown removed from base 205) to protect it from the weather and being struck with foreign objects, and to streamline the antenna assembly 200 to reduce the impact of drag caused by the antenna positioner on the mobile platform. In other variations, antenna feed 255 may also be fixed to radome 290. Because the lens/reflector assembly may be passive, and the antenna feed 255 may be stationary with respect to the lens/reflector assembly, the antenna positioner may not have any RF rotary joints or other components that transmit electrical signals between the rotatable and non-rotatable components of the antenna positioner.

The antenna positioners described herein may support various types of antenna elements to receive radio-frequency (RF) electromagnetic waves in addition to the above-described antenna elements, e.g. a horn, a concentrator, a flat panel array, etc. In addition, some of the antenna elements of an antenna system may be supported by a movable mount of the antenna positioner, and some of the antenna elements may be fixed relative to the base, so that the movable mount positions certain of the antenna elements relative to other antenna elements. The antenna positioner may also be scalable to support larger or smaller antenna elements, or support other frequency bands.

Figure 3:
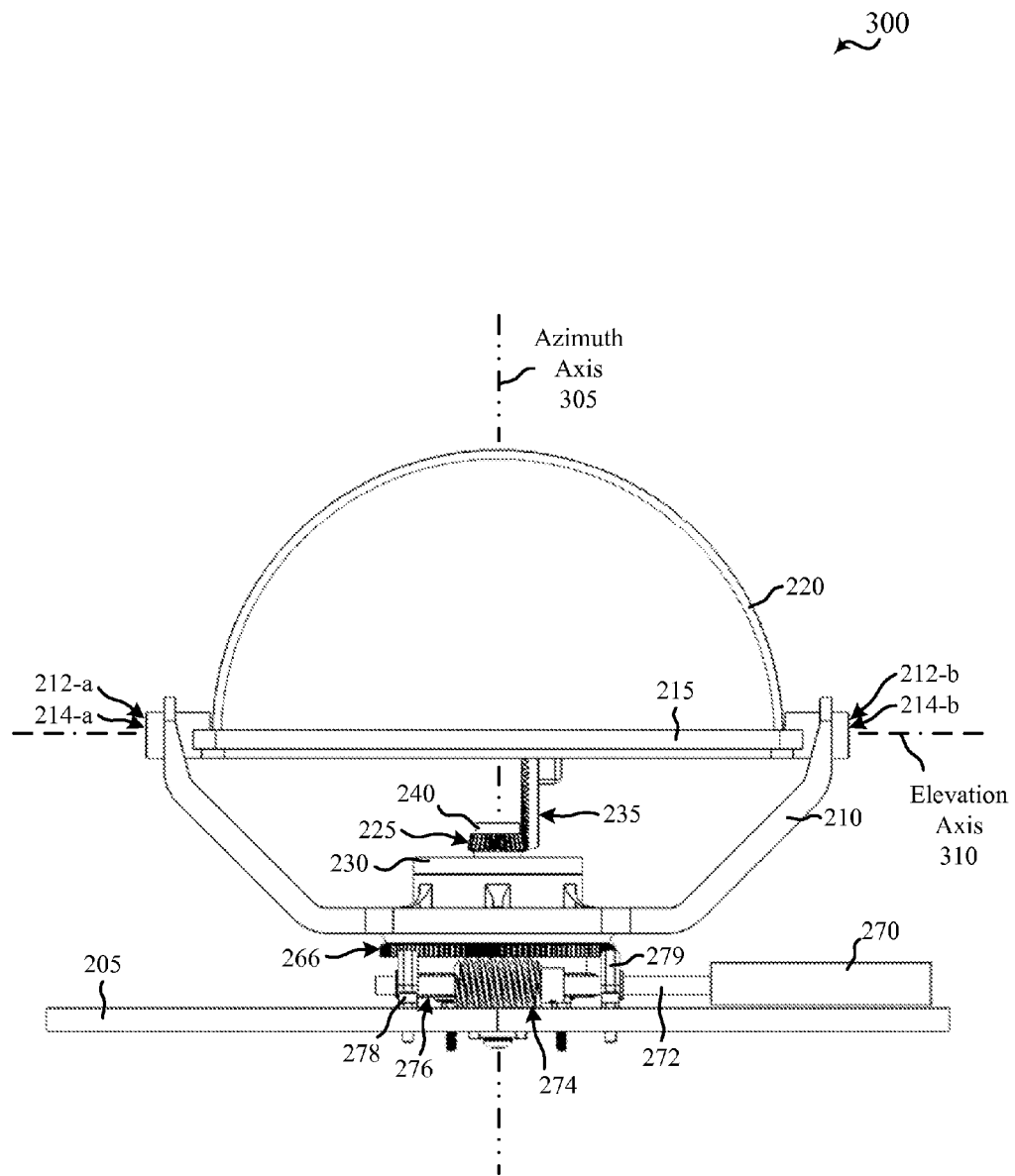
FIG. 3 illustrates a front view of portions of an antenna positioner of an antenna assembly, in accordance with various aspects of the present disclosure.

FIG. 3 illustrates a front view 300 of portions of the antenna positioner of antenna assembly 200, in accordance with various aspects of the present disclosure. For ease of understanding, radome 290, transceiver 250, and antenna feed 255 are omitted in front view 300. Azimuth axis 305 is coaxial with the center of rotation for the antenna element, including reflector 215 and lens 220. Azimuth axis 305 may also be coaxial with the center of rotation for other components, including bevel gear 225, center drive shaft 230, azimuth ring gear 266, and elevation ring gear 276. Elevation axis 310 is the axis of rotation for the antenna element, including reflector 215 and lens 220, relative to mount 210 provided by bushing 212-a and busing 212-b.

Figure 4:
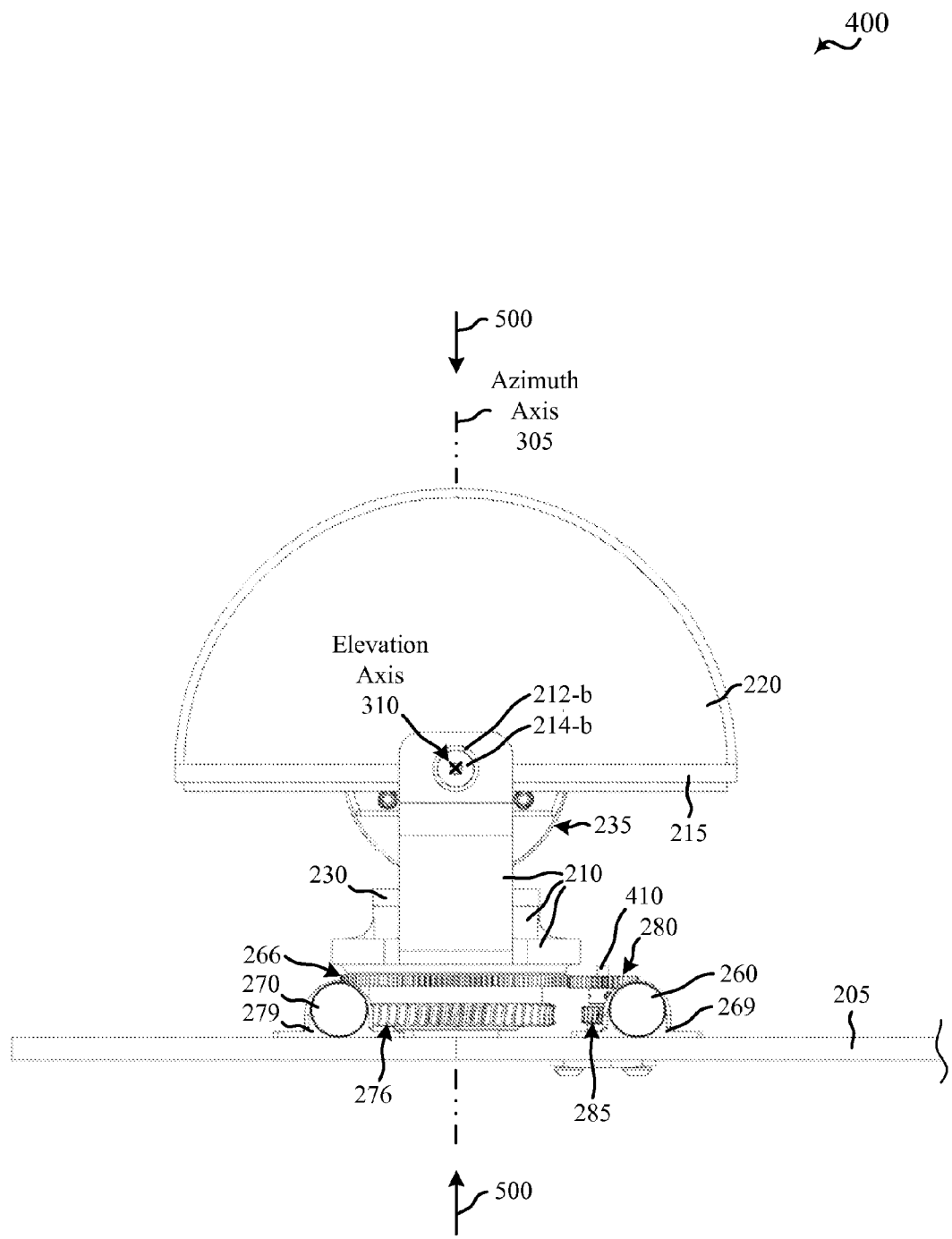
FIG. 4 illustrates a right-side view of portions of an antenna positioner of an antenna assembly, in accordance with various aspects of the present disclosure.

FIG. 4 illustrates a right-side view 400 of portions of the antenna positioner of antenna assembly 200, in accordance with various aspects of the present disclosure. For ease of understanding, radome 290, transceiver 250, and antenna feed 255, as well as certain support and fastener elements, are omitted in right-side view 400. Azimuth axis 305 may be coaxial with the center of rotation for, among other components, azimuth ring gear 266 and elevation ring gear 276. Elevation axis 310, which may be perpendicular to the sheet plane, is an axis of elevation rotation for the antenna element, including reflector 215 and lens 220, relative to mount 210 provided by bushing 212-*a* and bushing 212-*b*.

Focusing on elements that cause rotation of the mount 210 about the azimuth axis 305, attached to mount 210 may be an azimuth ring gear 266, which may be a spur ring gear, the teeth of which mesh with spur gear 280 that may be coaxially mounted with a worm gear 285 on rod 410. The teeth of worm gear 285 may mesh with a worm screw (not shown, but behind azimuth motor 260 in this view) that may be mounted on a rod (not shown, but also behind azimuth motor 260 in this view). The rod may be rotatably supported by bearing assemblies, including bearing assembly 269, and may be driven by azimuth motor 260. Azimuth motor 260 may be any suitable drive motor, e.g. a stepper motor.

Focusing on elements that cause rotation of the antenna elements about the elevation axis 310, elevation motor 270 drives a worm screw (not shown, but behind elevation motor 270 in this view) to rotate on a rod. The teeth of the worm screw (not shown) mesh with the gear teeth of elevation ring gear 276 to rotate center drive shaft 230 and bevel gear (not shown) that is mounted to center drive shaft 230. The teeth of the bevel gear (not shown) alternately mesh with the teeth of the bevel gear 235, which may be mounted to reflector 215, to cause the antenna elements, including reflector 215 and lens 220, to rotate about the elevation axis 310.

Bevel gear 235, which may be directly or indirectly mounted to reflector 215, may be dimensioned relative to the reflector 215 such that the diameter of the bevel gear 235, oriented perpendicular to the elevation axis 310, may be 0.3 times the diameter of the reflector 215 perpendicular to the elevation axis 310. In other implementations, the bevel gear 235 may have a smaller diameter to accommodate taller azimuth and elevation drive elements, for example a center drive shaft 230 that is relatively taller. In such case, the diameter of the bevel gear 235 may be 0.2 to 0.3 times the diameter of the reflector 215. In other implementations, the bevel gear 235 may have a larger diameter to accommodate shorter azimuth and elevation drive elements, for example a center drive shaft 230 that is relatively shorter. In such case, the diameter of the bevel gear 235 may be 0.3 to 0.5 times the diameter of the reflector 215. Bevel gear 235 may also be dimensioned to accommodate yet other configurations of the antenna positioner.

FIG. 5 illustrates a cross-sectional view 500 of portions of the antenna positioner of antenna assembly 200, in accordance with various aspects of the present disclosure. Cross-sectional view 500 is a front-side cross section through azimuth axis 305 of right-side view 400, in the position as indicated by the arrows for cross-sectional view 500 in FIG. 4.

FIG. 5 further illustrates some of the internal aspects of the antenna positioner. Fixedly mounted to base 205 is support element 510. A fixing cap 240 may be fastened to the top of support element 510 to rotatably secure various elements that rotate about the azimuth axis 305.

Bearings 520 and bearings 550 provide rotatable support for the center drive shaft 230, which includes both a cap and a hollow shaft. Bevel gear 225 may be fixedly attached at a top portion of center drive shaft 230. Elevation ring gear 276 may be fixedly attached at a bottom portion of center drive shaft 230. Bevel gear 225, center drive shaft 230, and elevation ring gear 276 are substantially radially symmetric about their central axes, each of which may be substantially aligned and coaxial with azimuth axis 305, and together may rotate about the azimuth axis via bearings 520 and bearings 550.

Bearings 540 provide rotatable support for mount 210. Azimuth ring gear 266 may be fixedly attached at a bottom portion of mount 210. Azimuth ring gear 266 may be substantially radially symmetric about azimuth axis 305. Reflector 215 and lens 220 may be attached to mount 210 to rotate about elevation axis 310 via bushing 212-*a* and bushing 212-*b*.

Figure 6:
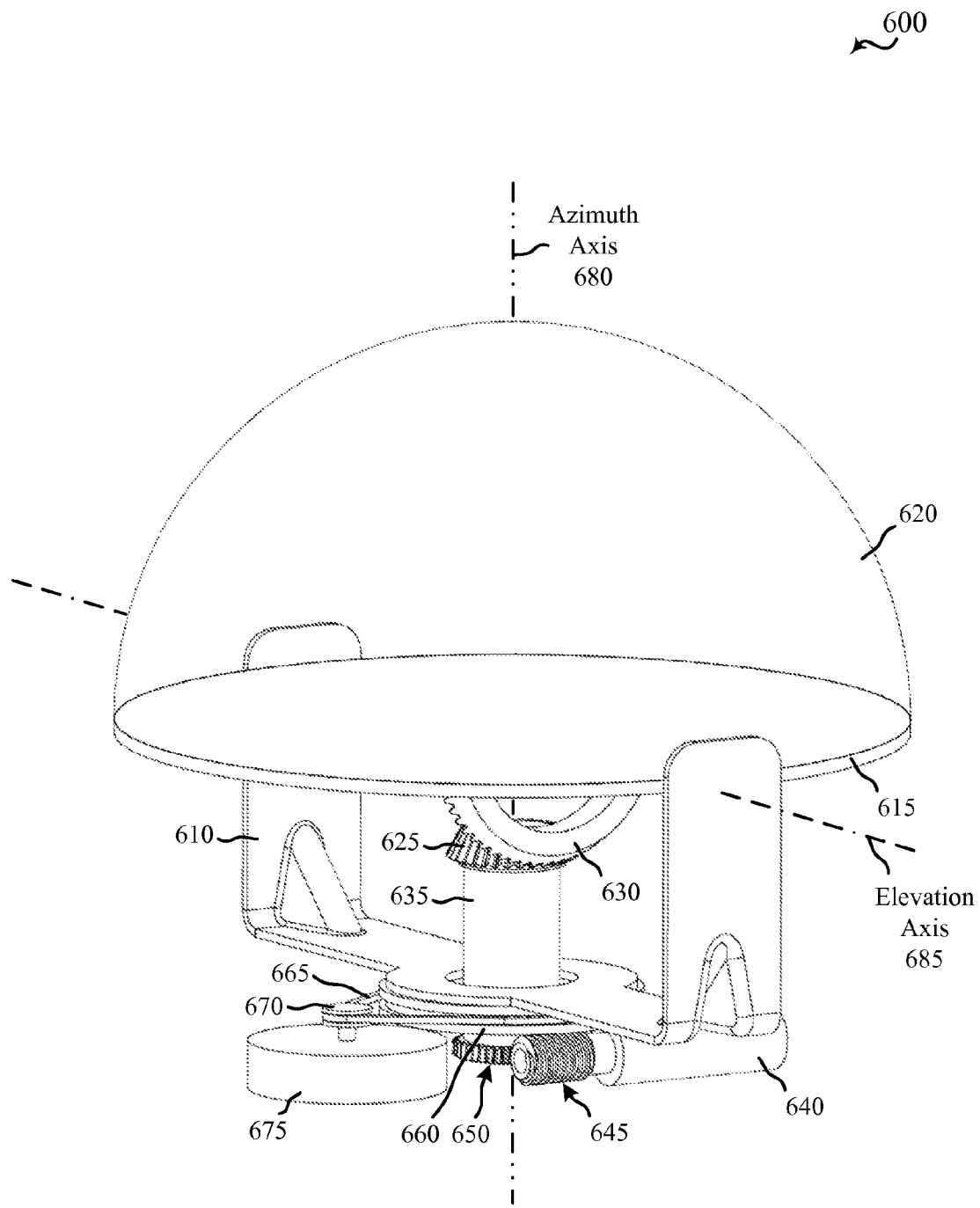
FIG. 6 illustrates a perspective view of portions of a second example of an antenna positioner, in accordance with various aspects of the present disclosure.

FIG. 6 illustrates a perspective view 600 of portions of a second example of an antenna positioner, in accordance with various aspects of the present disclosure. For ease of understanding and to better view the features discussed below, a radome, transceiver, antenna feed, and base are omitted from this view of the antenna positioner.

In this second example, mount 610 supports an antenna element, including reflector 615 and lens 620 to rotate about elevation axis 685. Rotatable support may be provided by any suitable device, e.g. bearings, bushings, etc. Attached to reflector 615 may be a bevel gear 630 having a number of gear teeth. The gear teeth of bevel gear 630 alternately mesh with the gear teeth of bevel gear 625. Bevel gear 630 traces an arc whose center point lies on elevation axis 685, such that as reflector 615 and lens 620 rotate with respect to elevation axis 685, the gear teeth of bevel gear 630 continue to mesh with the gear teeth of bevel gear 625.

Bevel gear 625 may be fixedly mounted to a top portion of center drive shaft 635. Bevel gear 625 and center drive shaft 635 may also be formed as a single workpiece, for example by machining bevel gear 625 and center drive shaft 635 from the same piece of stock. Center drive shaft 635 passes through an opening in mount 610. Fixedly mounted on a bottom portion of center drive shaft 635 may be worm ring gear 650. Bevel gear 625, center drive shaft 635, and worm ring gear 650 together may have a hollow opening along the azimuth axis 680. Together, bevel gear 625, center drive shaft 635, and worm ring gear 650 may rotate about the azimuth axis 680. The teeth of worm ring gear 650 mesh with worm screw 645, which may be driven by elevation motor 640. Thus, elevation motor 640 may cause rotation of reflector 615 and lens 620 rotate about elevation axis 685.

Fixedly attached to a bottom portion of mount 610 may be azimuth pulley 660. Azimuth pulley 660 may be symmetric about azimuth axis 680, and coupled to drive pulley 670 via belt 665. Drive pulley 670 may be driven by azimuth motor 675.

One or both of azimuth motor 675 and elevation motor 640 may be a stepper motor, for example one of the various stepper motors described above with respect to azimuth motor 260 and/or elevation motor 270 of FIGS. 2, 3, and/or 4.

Azimuth motor 675 and elevation motor 640 may be connected to a control circuit to separately drive azimuth motor 675 and elevation motor 640 to control the positioning of the antenna positioner, e.g. to compensate for movements of the mobile platform.

In another variation of this second example, the worm ring gear driven by the elevation motor may instead be a second pulley driven by the elevation motor via a second belt. This second motor may be a second stepper motor, for example a pancake-style stepper motor. Other types of motors with other form factors, including stepper motors, may be used to drive azimuth pulley 660 and/or the second pulley, including for example permanent magnet or hybrid stepper motors, which may be two-phase bipolar, or four-phase unipolar stepper motors. The positioning resolution of the antenna positioner may be based at least in part on the positioning resolution of the stepper motor, which may be for example twenty-four, forty-eight, or two hundred steps per revolution.

The above-described pulley and belt system may instead comprise chains and sprockets. For example, belt 665 may be one of a variety of chains such as a drive chain, and the azimuth pulley 660 and drive pulley 670 may each instead be sprockets configured to operate with the selected chain.

Figure 7:
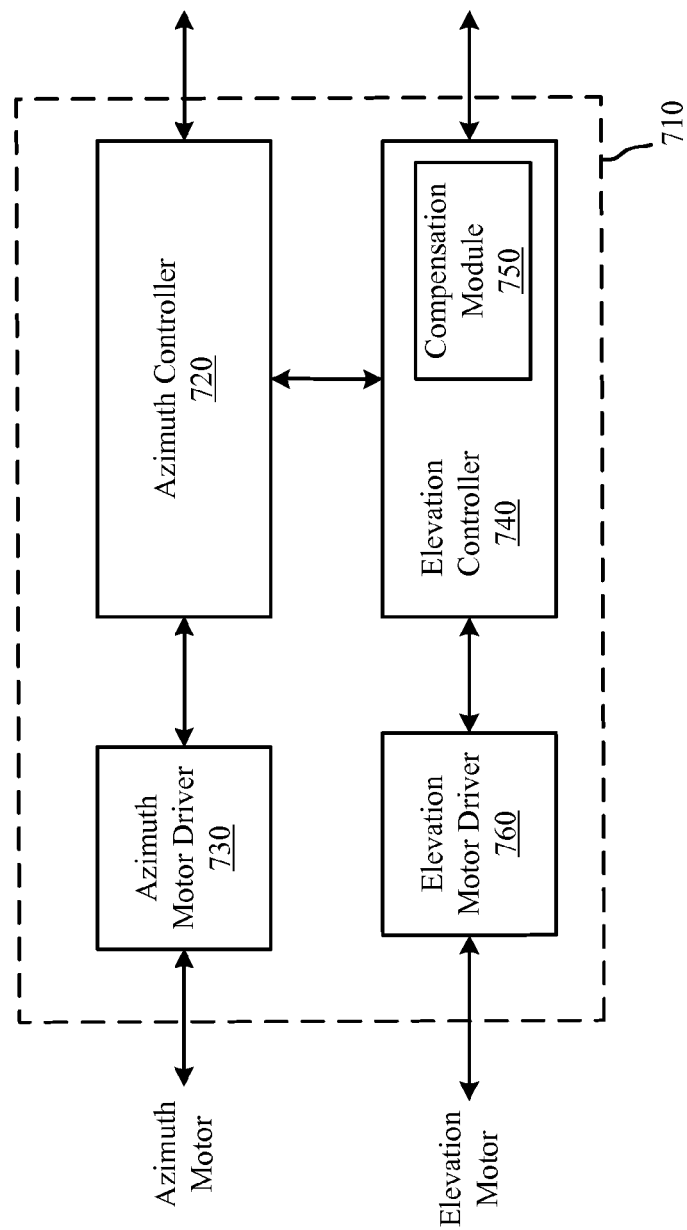
FIG. 7 is a block diagram illustrating a control circuit for an antenna positioner, in accordance with various aspects of the present disclosure.

FIG. 7 is a block diagram 700 illustrating a control circuit 710 for an antenna positioner, in accordance with various aspects of the present disclosure. Control circuit 710 may be configured to control an azimuth motor and an elevation motor of an antenna positioner to control the antenna positioner relative to a satellite. This movement may be to compensate for movements of antenna elements relative to the satellite so that the antenna remains pointed at the satellite, for example because of movement of a mobile platform to which the antenna elements are mounted, or to position an antenna element relative to a new satellite, for example when a mobile platform crosses from the coverage area of a first satellite to a coverage area of a second satellite. All or portions of control circuit 710 may be part of transceiver 250 shown in FIG. 2.

Azimuth controller 720 generates step and control signals for the azimuth motor based on received instructions regarding the magnitude and direction for movement of the antenna elements of the antenna positioner relative to the mobile platform. Azimuth motor driver 730 may include power transistors to generate drive current for the azimuth motor from a DC power source according to the step and control signals.

Elevation controller 740 generates step and control signals for the elevation motor based on received instructions regarding the magnitude and direction for movement of the antenna elements of the antenna positioner relative to the mobile platform. Elevation motor driver 760 may include power transistors to generate drive current for the elevation motor from a DC power source according to the step and control signals.

Elevation controller 740 includes a compensation module 750 that operates to counteract the cross coupling of the mount between the azimuth axis and the elevation axis due to the use of a bevel gear set. Cross-coupling means that as the mount rotates about the azimuth axis, the arrangement of gear components of the antenna positioner is such that this azimuth rotation will affect a rotation of the antenna elements about the elevation axis if the elevation motor is static, i.e. not operating to drive a rotation of the center drive shaft about its central axis. This can be seen with reference to FIGS. 3 and 4 by considering the case where the elevation motor 270 remains static while azimuth motor 260 drives rotation about the azimuth axis 305. If elevation motor 270 is static, then rod 272, elevation worm screw 274, elevation ring gear 276, and bevel gear 225 are also held static relative to base 205. As the azimuth motor causes a rotation of mount 210 (and thus reflector 215, lens 220, and bevel gear 235) about azimuth axis 305 relative to base 205, bevel gear 235 may be also driven about the azimuth axis, and thus driven relative to bevel gear 225 that is static. The rotation of the meshed gear teeth of bevel gear 235 and bevel gear 225 cause a rotation of reflector 215 and lens 220 about elevation axis 310 because reflector 215 may be rotatably attached to mount 210. This may be the cross-coupling for which the compensation module 750 compensates. Reflector 215 and lens 220 may be held at a constant elevation, i.e. no rotation about the elevation axis 310, during rotation about azimuth axis 305 by rotating the bevel gear 225 to counteract the rotation of mount 210 that is driven about azimuth axis 305. For example, bevel gear 225 may be driven to rotate about its central axis and mount 210 may be driven about azimuth axis 305 at the same rate and direction to maintain a constant elevation angle while changing the azimuth angle. To concurrently change azimuth and elevation angles, bevel gear 225 may be driven to rotate at a different rate and/or direction than mount 210. Thus, compensation module 750 of elevation controller 740 provides compensation input to elevation controller 740 according to a signal received from azimuth controller 720 regarding the direction and magnitude of rotation about an azimuth axis. Such information may be a message or signal sent from azimuth controller 720 specifically for such purpose. Compensation module 750 may also receive the same instructions as azimuth controller 720, and provide compensation input to elevation controller 740 based on those instructions.

Figure 8:
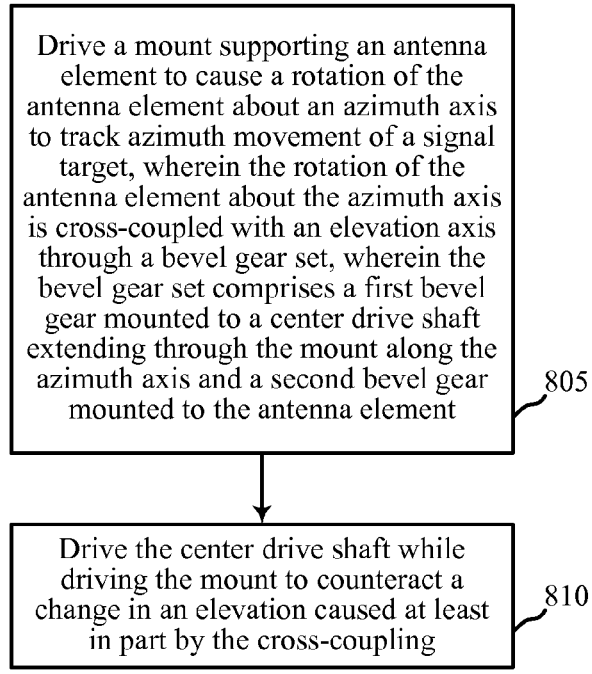
FIG. 8 is a flow chart illustrating a first example of a method for positioning an antenna, in accordance with various aspects of the present disclosure.

FIG. 8 is a flow chart illustrating a first example of a method 800 for positioning an antenna, in accordance with various aspects of the present disclosure. For clarity, the method 800 may be described below with reference to aspects of one or more of the apparatuses for positioning an antenna described with reference to FIGS. 1-7. In some examples, the apparatus for positioning an antenna may execute one or more instructions to perform the functions described below. Additionally or alternatively, the apparatus for positioning an antenna may perform one or more of the functions described below using special-purpose hardware.

At block 805, the method 800 may include driving a mount supporting an antenna element to cause a rotation of the antenna element about an azimuth axis to track azimuth movement of a signal target, wherein the rotation of the antenna element about the azimuth axis may be cross-coupled with an elevation axis through a bevel gear set, wherein the bevel gear set comprises a first bevel gear mounted to a center drive shaft extending through the mount along the azimuth axis and a second bevel gear mounted to the antenna element. Driving the mount may be performed by one or more of azimuth motor 260 of FIGS. 2-5 and azimuth motor 675 of FIG. 6. The mount may be in accord with one or more of mount 210 of FIGS. 2-5 and mount 610 of FIG. 6. The antenna element may be in accord with one or more of reflector 215 and lens 220 of FIGS. 2-5 and reflector 615 and lens 620 of FIG. 6. The first bevel gear may be in accord with one or more of bevel gear 225 of FIGS. 2-5 and bevel gear 625 of FIG. 6. The second bevel gear may be in accord with one or more of bevel gear 235 of FIGS. 2-5 and bevel gear 630 of FIG. 6. The center drive shaft may be in accord with one or more of center drive shaft 230 of FIGS. 2-5 and center drive shaft 635 of FIG. 6.

At block 810, the method 800 may include driving the center drive shaft while driving the mount to counteract a change in an elevation caused at least in part by the cross-coupling. Driving the center drive shaft may be performed by one or more of elevation motor 270 of FIGS. 2-5 and elevation motor 640 of FIG. 6. The center drive shaft may be in accord with one or more of center drive shaft 230 of FIGS. 2-5 and center drive shaft 635 of FIG. 6.

Figure 9:
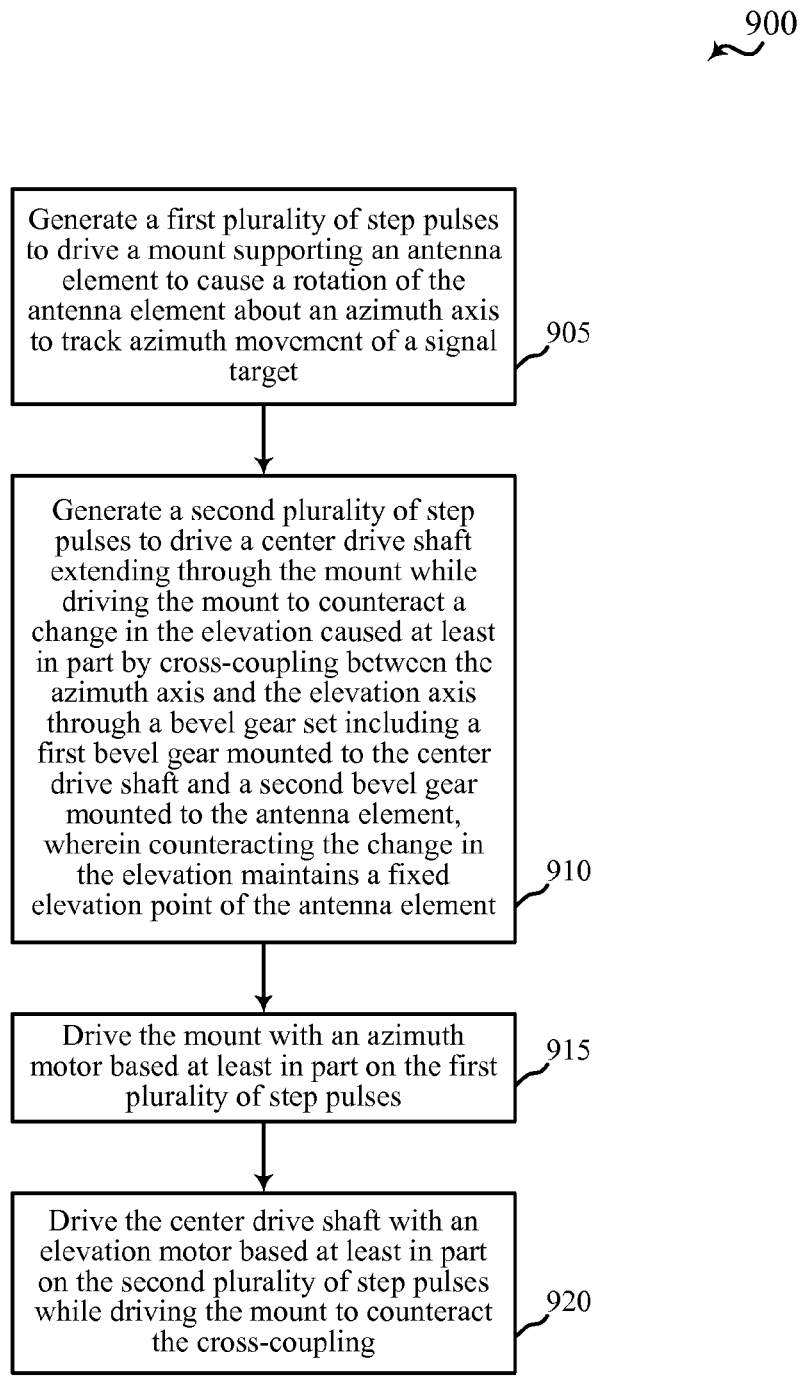
FIG. 9 is a flow chart illustrating a second example of a method for positioning an antenna, in accordance with various aspects of the present disclosure.

FIG. 9 is a flow chart illustrating a second example of a method 900 for positioning an antenna, in accordance with various aspects of the present disclosure. For clarity, the method 900 may be described below with reference to aspects of one or more of the apparatuses for positioning an antenna described with reference to FIGS. 1-7. In some examples, the apparatus for positioning an antenna may execute one or more instructions to perform the functions described below. Additionally or alternatively, the apparatus for positioning an antenna may perform one or more of the functions described below using special-purpose hardware.

At block 905, the method 900 may include generating a first plurality of step pulses to drive a mount supporting an antenna element to cause a rotation of the antenna element about an azimuth axis to track azimuth movement of a signal target. Generating a first plurality of step pulses may be performed by azimuth controller 720 of FIG. 7. The mount may be in accord with one or more of mount 210 of FIGS. 2-5 and mount 610 of FIG. 6. The antenna element may be in accord with one or more of reflector 215 and lens 220 of FIGS. 2-5 and reflector 615 and lens 620 of FIG. 6. The signal target may be in accord with, for example, satellite 125 of FIG. 1.

At block 910, the method 900 may include generating a second plurality of step pulses to drive a center drive shaft extending through the mount to counteract a change in the elevation caused at least in part by cross-coupling between the azimuth axis and the elevation axis through a bevel gear set including a first bevel gear mounted to the center drive shaft and a second bevel gear mounted to the antenna element, wherein counteracting the change in the elevation maintains a fixed elevation point of the antenna element. Generating a second plurality of step pulses to drive a center drive shaft extending through the mount may be performed by elevation controller 740, including compensation module 750, of FIG. 7. The center drive shaft may be in accord with one or more of center drive shaft 230 of FIGS. 2-5 and center drive shaft 635 of FIG. 6. The first bevel gear may be in accord with one or more of bevel gear 225 of FIGS. 2-5 and bevel gear 625 of FIG. 6. The second bevel gear may be in accord with one or more of bevel gear 235 of FIGS. 2-5 and bevel gear 630 of FIG. 6.

At block 915, the method 900 may include driving the mount with an azimuth motor based at least in part on the first plurality of step pulses. Driving the mount may be performed by one or more of azimuth motor 260 of FIGS. 2-5 and azimuth motor 675 of FIG. 6.

At block 920, the method 900 may include driving the center drive shaft with an elevation motor based at least in part on the second plurality of step pulses while driving the mount to counteract the cross-coupling. Driving the center drive shaft may be performed by one or more of elevation motor 270 of FIGS. 2-5 and elevation motor 640 of FIG. 6.

In some examples, aspects from two or more of method 800 and method 900 may be combined. It should be noted that method 800 and method 900 are just example implementations, and that the operations of method 800 and method 900 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein, and in particular with respect to FIGS. 7-9, may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein, and in particular with respect to FIGS. 7-9, may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. An apparatus for positioning an antenna, comprising:
   a base;
   an antenna feed having a location that is fixed relative to the base;
   a mount rotatably coupled with the base about an azimuth axis of the mount;
   an antenna element supported by and rotatably coupled with the mount about an elevation axis of the mount;

a center drive shaft extending through the mount along the azimuth axis; and a bevel gear set comprising a first bevel gear and a second bevel gear, the first bevel gear fixedly coupled with the center drive shaft and the second bevel gear fixedly coupled with the antenna element, such that the bevel gear set rotates the antenna element about the elevation axis in response to a rotation of the center drive shaft.

2. The apparatus of claim 1, wherein:

the first bevel gear comprises a pinion gear coupled with the center drive shaft to rotate about a pinion gear axis; and the second bevel gear comprises a partial ring gear to be driven by the pinion gear to rotate about a ring gear axis.

3. The apparatus of claim 2, wherein the pinion gear comprises a plurality of pinion gear teeth, and wherein the partial ring gear comprises a plurality of ring gear teeth to alternately mesh with the plurality of pinion gear teeth.

4. The apparatus of claim 2, wherein the ring gear axis is coaxial with the elevation axis.

5. The apparatus of claim 1, wherein the bevel gear set comprises a friction drive gear set.

6. The apparatus of claim 1, wherein the center drive shaft and the first bevel gear are hollow.

7. The apparatus of claim 1, wherein the center drive shaft and the first bevel gear together comprise a single workpiece.

8. The apparatus of claim 1, further comprising:

an elevation drive gear set comprising:

a first elevation gear coupled with an elevation motor about a first elevation gear axis; and a second elevation gear coupled with and driven by the first elevation gear, the second elevation gear fixedly coupled with the center drive shaft.

9. The apparatus of claim 1, further comprising:

an azimuth drive gear set comprising:

a first azimuth gear coupled with an azimuth motor about a first gear axis; and a second azimuth gear coupled with and driven by the first azimuth gear, the second azimuth gear fixedly coupled with the mount.

10. The apparatus of claim 9, wherein the second azimuth gear is coupled with the first azimuth gear via an azimuth drive belt.

11. The apparatus of claim 1, wherein the antenna element comprises a passive reflecting device supported by the mount, and the antenna feed is pointed at the passive reflecting device.

12. The apparatus of claim 11, wherein the antenna feed is pointed at the passive reflecting device to radiate toward the passive reflecting device to produce a beam that the passive reflecting device directs toward a signal target.

13. The apparatus of claim 11, wherein the antenna feed is pointed at the passive reflecting device to receive radiation directed to the antenna feed by the passive reflecting device, the passive reflecting device to receive a beam from a signal target.

14. The apparatus of claim 1, further comprising:

a control circuit;

an azimuth motor coupled with the control circuit and the mount; and an elevation motor coupled with the control circuit and the center drive shaft to drive the center drive shaft, wherein the control circuit controls the azimuth motor to drive the mount about the azimuth axis to track azimuth movement of a signal target relative to the antenna, and controls the elevation motor to drive the center drive shaft to counteract a rotational cross-coupling between the azimuth axis and the elevation axis due to the bevel gear set.

15. The antenna of claim 14, wherein the control circuit controls the elevation motor to maintain a fixed elevation point of the antenna element during a rotation of the antenna element about the azimuth axis.

16. A method for positioning an antenna, comprising:

driving a mount rotatably coupled with a base and supporting an antenna element to cause a rotation of the antenna element about an azimuth axis to track azimuth movement of a signal target, wherein an antenna feed is fixedly coupled with the base, and wherein the rotation of the antenna element about the azimuth axis is cross-coupled with an elevation axis through a bevel gear set, wherein the bevel gear set comprises a first bevel gear mounted to a center drive shaft extending through the mount along the azimuth axis and a second bevel gear mounted to the antenna element; and driving the center drive shaft while driving the mount to counteract a change in an elevation caused at least in part by the cross-coupling.

17. The method of claim 16, wherein driving the center drive shaft while driving the mount to counteract the change in the elevation caused at least in part by the cross-coupling comprises maintaining the elevation at a fixed elevation point of the antenna element during the rotation of the antenna element about the azimuth axis.

18. The method of claim 16, wherein the antenna element comprises a passive reflecting device.

19. The method of claim 18, further comprising:

driving the mount supporting the passive reflecting device to direct radiation from the antenna feed toward the signal target.

20. The method of claim 18, further comprising:

driving the mount supporting the passive reflecting device to direct radiation from the signal target towards the antenna feed.

\* \* \* \* \*